United States Patent Office 3,250,745
Patented May 10, 1966

3,250,745
ALKYLATED BISPHENOL ALKYLENE OXIDE ADDUCT BASED POLYURETHANE PREPOLYMERS
Gifford Daniel Davis, East Orange, and Morris N. Schneider, Metuchen, N.J., assignors to Nopco Chemical Company, Newark, N.J., a corporation of New Jersey
No Drawing. Filed Aug. 4, 1961, Ser. No. 129,242
18 Claims. (Cl. 260—47)

This invention relates to new compositions of matter. More particularly, this invention relates to new compositions of matter which are useful as polyisocyanate prepolymers, and to coating compositions and castings prepared therefrom.

Many polyisocyanate prepolymers are known in the art. These prepolymers are extensively used in the manufacture of lacquers, elastomers, adhesives, etc. The polyisocyanate prepolymers previously prepared by the art are soluble only in polar oxygenated solvents. These oxygenated solvents, e.g., ketones, ethers and esters, are expensive and are difficult to render anhydrous. Anhydrous solvents are essential when the free isocyanate groups are present as for example in a polyisocyanate prepolymer, because the slightest trace of water will cause the polyisocyanate prepolymer to advance in viscosity or gel due to the reaction of water with the free isocyanate groups.

Accordingly, it is an object of this invention to provide prepolymers which are soluble in inexpensive non-polar solvents, which solvents can be readily rendered anhydrous.

Another object of this invention is to prepare coating compositions and castings using the prepolymers of this invention.

Other objects and advantages will become more apparent from the following more complete description and claims.

It has been unexpectedly discovered that the above as well as other objects can be accomplished in the following manner.

Broadly, this invention contemplates a composition of matter according to the following structure:

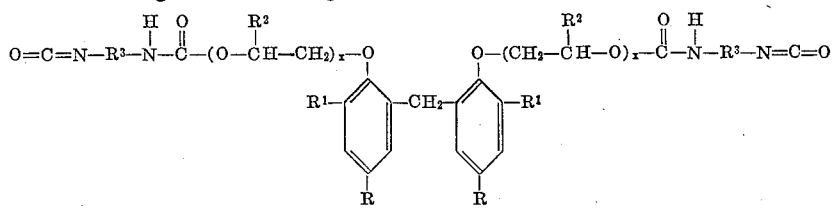

wherein R is an alkyl group of from 8 to 12 carbon atoms, $R^1$ and $R^2$ are selected from the group consisting of methyl and hydrogen, $x$ is from 1 to 2, and $R^3$ is selected from the class consisting of alkylene, arylene, and arylalkylene groups, and when $R^3$ is alkylene, said alkylene $R^3$ has from four to six carbon atoms, when $R^3$ is arylene said arylene $R^3$ has from six to thirteen carbon atoms, and when $R^3$ is arylalkylene, said arylalkylene $R^3$ has from 7 to 10 carbon atoms.

By the term arylalkylene, we encompass a material which contains an aromatic ring substituted with alkylene groups and which has both functional isocyanate groups attached to the alkylene groups. Exemplary of such materials is the xylylene group as in xylylene diisocyanate and the like.

By the term arylene, we include a material containing alkyl substituted arylene groups in which the isocyanate groups are directly connected to the aromatic ring, such as the methyl-phenylene structure in toluene diisocyanate.

Generally speaking, the compositions of this invention may be prepared in the following manner. A para alkylated phenol or a para alkylated orthocresol is first reacted with formaldehyde. The resultant bisphenol is then reacted with ethylene oxide or propylene oxide to form a condensate (glycol) conforming to the following structure:

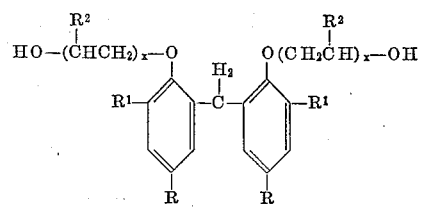

wherein R is an alkyl group of from 8 to 12 carbon atoms, $x$ is from 1 to 2 and $R^1$ and $R^2$ are either a hydrogen or methyl group. The glycol is then reacted with from about 1 to 1.1 mols, per glycol hydroxyl group, of a suitable diisocyanate to form the prepolymers of this invention.

If desired, the free isocyanate group of the prepolymers of this invention may be blocked with a suitable blocking agent.

The bisphenol may be prepared by reacting from 1.67 to 2.00 mols of a para alkylated phenol or a para alkylated ortho-cresol with one mol of formaldehyde or equivalent amounts of paraformaldehyde, trioxane, and the like. Condensation temperatures of from about 55 to 105° C. are maintained for about 2 to 6 hours. The resulting product is essentially a bisphenol of the formula:

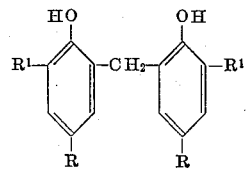

wherein the substituents R and $R^1$ are as described previously.

If less than about 1.67 moles of para alkylated phenol or para alkylated ortho-cresol is used per mole of formaldehyde, excessive amounts of trimeric or longer chain novolacs will form.

These larger molecule novolacs are undesirable because the product is too viscous and presents handling problems. On the other hand, where the proper ratios are used, the product is essentially a bisphenol and is reasonably fluid upon heating to from 80 to 100° C. There is no advantage to using more than two moles of the aforesaid ratio because only two moles of phenol can combine with one mole of formaldehyde. Therefore, any excess of alkylated phenol used would merely be a contaminant of the product.

The temperature at which the phenol is condensed with the aldehyde is not critical. However, at temperatures below about 55° C., the reaction proceeds slowly. There is no advantage to using temperatures in excess of 90° C. as both reagents are volatile and precautions would of necessity be required to minimize reagent loss. We prefer to use a condensation temperature of about 65° C. as we have obtained excellent results at this temperature.

Although the time of reaction of the aldehyde with the phenol or cresol is from 2 to 6 hours, we may use shorter or longer periods of time. Naturally, the time of reaction would also depend upon the temperature of reaction. The higher temperatures would require a shorter reaction time and the lower temperatures would require a longer reaction time. If the reaction is continued for more than the required amount of time it will not adversely affect the bisphenol, except possibly to darken its color somewhat.

The resultant bisphenol prepared as described above, is then reacted with ethylene oxide or propylene oxide in an amount sufficient to provide for an average of from 1 to 2 moles, preferably 1.1 to 1.5 moles, of ethylene or propylene oxide per each phenolic hydroxyl group. The ethylene oxide or propylene oxide addition is carried out by reacting the bisphenol with ethylene or propylene oxide at a temperature of from 150 to 200° C. If desired, the reaction may be carried out under pressure, e.g., up to 85 p.s.i. in the presence of about 0.1% of alkali hydroxide or alkali metal carbonate as catalyst, said 0.1% being based on the total weight of the bisphenol.

If less than one mole of ethylene oxide or propylene oxide is used per each phenolic hydroxyl group, then some of the phenolic hydroxyl groups would remain unreacted and would not be converted to alcoholic hydroxyl groups. The presence of phenolic hydroxyl groups is undesirable because phenols do not form heat stable linkages with isocyanates. Therefore a product whether a coating, elastomer, or hard casting, etc. would have heat sensitive linkages and be unsatisfactory. Generally speaking, we prefer to use at least 1.1 moles of ethylene oxide or propylene oxide for each phenolic hydroxyl group in order to assure the complete reaction of all the phenolic hydroxyl groups. On the other hand, while more than two moles of ethylene or propylene oxide may be used for each hydroxyl group, it is not desirable to do so, as an excess of ethylene or propylene oxide would reduce the solubility of the resulting glycol in non-polar solvents and would probably render polyurethanes prepared from the glycol, somewhat hydrophillic. If the temperature of the bisphenol-ethylene oxide or propylene oxide reaction is less than 150° C., the reaction will proceed at a slower rate. While the reaction can be accomplished at temperatures below 150° C., such is not desirable as the rate of reaction would be too slow for commercial application. It is likewise not desirable for the reaction temperatures to exceed 200° C. because the product would be unnecessarily darkened by such a high temperature.

If less than 0.1% of the catalyst is used the reaction will proceed slowly. If more than 0.1% is used then the product will be contaminated with this inorganic catalytic material.

However this invention is not to be construed as limited to any particular mode of preparing the glycol.

The prepolymers of this invention are prepared by reacting the glycol with from about 1 to 1.1 moles of a suitable diisocyanate, for each hydroxyl group at a temperature of about 40 to 50° C. for from about 4 to 5 hours until the desired isocyanate content is reached.

Whether or not the desired isocyanate content has been reached is determined by removing a sample of the reaction mixture and titrating the sample against di-n-butyl amine. Since the amine only reacts with free isocyanate groups, it is a simple matter to calculate the degree to which the reaction has proceeded.

While it is possible to react the diisocyanate with the glycol at temperatures below about 40° C., such low temperatures are not desired as the time of reaction would be unduly extended. If temperatures in excess of 50° C. are used, there is the risk that the resultant prepolymer will not conform to the theoretical formula, because at temperatures appreciably in excess of 50° C., the diisocyanate reacts with the hydroxyls of the glycol in a rapid manner enhancing the possibility that one diisocyanate molecule may react with both of the free hydroxyl groups of the glycol. This leads to polymers and free diisocyanates, both of which are undesirable.

The length of time of the reaction of the glycol with the diisocyanate is not critical and is determined by the results of the analysis of the free isocyanate content.

Among the diisocyanates which can be used to prepare the compositions of this invention are meta-phenylene diisocyanate, para-phenylene diisocyanate, para-para'-diphenyl diisocyanate, and substituted products thereof such as diphenyl-3,3'-dimethyl-4,4'-diisocyanate, and diphenyl-3,3'-dimethoxy-4,4'-diisocyanate, or we may use 1,5-naphthylene diisocyanate; diphenylmethane - 4,4' - diisocyanate; pentamethylene - omega - omega' diisocyanate; hexamethylene omega-omega' diisocyanate, toluene diisocyanate, diphenyl diisocyanate, triphenyl diisocyanate, chlorophenyl-2,4-diisocyanate, decamethylenediisocyanate, and the like. Where toluene diisocyanate is used we may use pure toluene 2,4-diisocyanate or a commercial mixture composed of about 80% 2,4-toluene diisocyanate and 20% 2,6-toluene diisocyanate.

If desired, we may block the free isocyanate group with any known blocking agent. By blocking the diisocyanate group we render the prepolymer relatively inert under standard storage conditions and thus prolong the shelf life of this product for later reaction with a cross linking agent. Generally speaking we would employ a slight excess over one mole of the blocking agent for each free isocyanate group which is desired to be blocked. A slight excess is used to assure complete blocking of the free isocyanate groups. Blocking is accomplished by any one of the known methods. The manner of blocking is known in the art and need not be discussed here; however generally speaking blocking may be accomplished by adding the blocking agent and 0.2% by weight of the total weight of the entire mixture, of a tertiary amine as a catalyst to the prepolymer. The reaction is run at a temperature of from about 75 to 80° C. until a sample of the reaction mixture when tested with di-n-butyl amine for free isocyanate groups, gives a negative result. We may use blocking agents such as phenol or other phenols such as cresols, chlorophenols and the like, or we may use tertiary alcohols such as tertiary butanol and the like. We prefer to use phenol because it is relatively inexpensive, reliable and easily removed at reasonable temperatures. In addition to the blocking agents listed above which will be removed merely by heating, we may use sodium bisulfite as a blocking agent. The last mentioned blocking agent is not readily removed by heating, but is removed by lowering the pH of the solution to below about 4.

When we desire to unblock the prepolymer, we may do so by heating the prepolymer at a temperature of from about 125 to 175° C. and higher. We prefer however to use temperatures of 150 to 160° C. as we have found these temperatures to be effective. However, higher temperatures may be used when a very rapid cure is desired.

As indicated before, in the prepolymers of this invention, R is an alkyl group of from eight to twelve carbon atoms such as octyl, nonyl, dodecyl, and the like. When R is less than eight carbon atoms, the solubility of the prepolymer in non-oxygenated non-polar solvents such as benzene, toluene, xylene, naphthalene, kerosene, hexane, Stoddard's solvent, Varnish Makers' and Painters' naphtha, and the like diminishes very rapidly. It is likewise true that R may be greater than twelve carbon atoms. However, as R increases beyond twelve carbon atoms, the ratio between the reactivity of the prepolymer and the weight of the prepolymer is a steadily diminishing one so that greater weights of the prepolymer would be needed for the same degree of reactivity as is present when R is, at most, twelve. In other words, more than 12 carbons on R is unnecessary and an undesirable dilution.

The prepolymers, prepared as aforedescribed, whether blocked or unblocked, can be cross linked with materials containing at least two active hydrogens.

By the term active hydrogen, we mean those materials containing at least two hydrogens capable of reacting with Grignard reagents. Exemplary of materials containing at least two active hydrogens are: glycols such as ethylene glycol, propylene glycol, etc.; polyols such as pentaerythritol, glucose, sucrose, dextrose, sorbitol, mannitol, etc.; hydroxy terminated polyesters such as those prepared by the reaction of dibasic acids with polyols, glycols, etc., such as the polyester of adipic acid and ethylene glycol etc.; polyamines such as diethylene triamine, triethylene tetramine, tetraethylene pentamine, hexaethylene heptamine, and the like; cellulose and cellulose derivatives such as cellulose acetate, cellulose butyrate, etc.; proteins such as wool, leather, etc.; and other materials containing at least two active hydrogens.

Among the resins which we can use are linear vinyl resins containing some hydroxyl or amino groups such as partially hydrolyzed vinyl acetate-vinyl chloride copolymers; incompletely acetalized poly vinyl alcohols; copolymers containing some allyl amine, and the like.

When we cross-link the prepolymer and resins, we tie the molecules together. The resins that are to be cross-linked by the prepolymer must be linear or slightly branched resins so that the resins are soluble in solvents normally used as for example in paints, or fusible so that that can be extruded or otherwise shaped before they are cross-linked. The isocyanate groups of the prepolymers are then reacted with the linear or slightly branched resins so that the resultant giant molecules are no longer fusible or soluble.

The cross-linking as described above is essential in preparing a durable coating composition of this invention. Cross-linking is accomplished when coating various substrates, by applying the prepolymer, cross-linking agent, and other ancillary ingredients such as pigments, flatting agents, metal driers and the like, to the substrate. Ancillary ingredients are well known to those skilled in the art and need not be further described here.

If the prepolymer has been blocked, then the coating composition on the substrate must be baked in order to unblock the isocyanate groups and allow the prepolymer to react and cross-link the system. Generally speaking, unblocking of the isocyanate groups can be accomplished at temperatures of from about 150 to 175° C.

If the prepolymer is not blocked, then the composition will cure and harden at room temperature within a few hours after blending the resin and prepolymer.

Among the substrates which can be coated using the prepolymer compositions of this invention are paper, wood, cloth, glass fibers, concrete, metals, other resinous or plastic materials, etc.

In the examples which follow, unless otherwise indicated, all percentages given are percents by weight.

In order to more fully illustrate the nature of this invention and the manner of practicing the same, the following examples are presented.

*Example I*

The purpose of this example is to illustrate the preparation of the glycol.

(A) *Preparation of the bis-phenol.*—7.97 parts by weight of trioxane were added to 91.15 parts by weight of p-tertiary octyl phenol and the resulting mixture heated to 55° C. until the phenol melted. The tertiary octyl substituent was derived from diisobutylene and has the following structure:

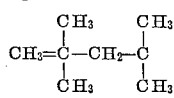

Diisobutylene is primarily a mixture of 2,4,4-trimethylpentene-1 and 2,4,4 - trimethylpentene-2. 0.88 part by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass which was a pinkish-white viscous material was neutralized with 0.96 part by weight of a 50% by weight aqueous potassium carbonate solution and agitated for an additional half hour. The mass was then brought up to a temperature of 150° C. while under a nitrogen atmosphere and this temperature was maintained for 2 hours. The product, which was essentially a bis-phenol, was a pinkish tacky resin having a total alkali content of 0.05%.

(B) *Preparation of the bisphenol ethylene oxide condensate.*—96.8 parts by weight of ethylene oxide were slowly added to 424 parts by weight of the bisphenol of part (A) in the presence of 0.4 part by weight of potassium carbonate as a catalyst which was dispersed in the bisphenol. The temperature was maintained at 170° C. during the ethylene oxide addition. The resulting condensate which was the aromatic based glycol was purged with nitrogen. It was a clear amber, tacky resin at room temperature.

*Example II*

The purpose of this example is to illustrate the preparation of the pre-polymer using a glycol corresponding in formula to the glycol of Example I, and prepared in substantially the same manner.

A commercial mixture of 27.8 parts of toluene diisocyanate isomers composed of about 80% 2,4 toluene diisocyanate and 20% 2,6 toluene diisocyanate was placed in a reaction vessel and 0.02 part of N,N-diethyl cyclohexylamine as a catalyst, 72.2 parts of xylene solution, containing 68% solids, the glycol formed by the addition of 2.2 moles of ethylene oxide to the bisphenol of octyl phenol formed as described in Example I were all added to the vessel. During the addition of the various reagents, the temperature was maintained at 35° C. and was then raised to 60° C. and maintained there for three hours until the free isocyanate content, determined by titration with 2 N di-n-butyl amine reached 9.6%. The entire reaction was run under a dry nitrogen atmosphere in order to protect the free isocyanate groups. The final product was adjusted to a 70% solids solution by the addition of xylene. The product was stored under nitrogen to protect the free isocyanate groups.

*Example III*

The purpose of Example III is to illustrate the blocking of the free isocyanate groups using phenol as a blocking agent.

9.8 parts of dry phenol containing 0.2 part of N,N diethyl cyclohexylamine as a catalyst and dissolved in 4.3 parts of xylene, was added to 64.3 parts of the prepolymer of Example II. During the addition the temperature was allowed to rise. The temperature was then raised to 75° C. and maintained there for three hours until the free isocyanate content, as determined by titration with 2 N di-n-butyl amine, indicated that there was no free isocyanate groups. The product was cooled to room temperature and 22.6 parts of xylene were added to the product in order to obtain a 55% solution of solids. The product was filtered and stored. There was no need to store the product under dry nitrogen because the isocyanate groups were blocked.

*Example IV*

The purpose of this example is to illustrate the blocking of the prepolymer of Example II using a different blocking agent. 8.5 parts of tertiary butanol and 0.2 part of N,N diethyl cyclo hexylamine were dissolved in 4.3 parts of xylene and added to 65.6 parts of the prepolymer of Example II. The reaction was run under a nitrogen atmosphere and the temperature was raised to 65° C. and maintained there for about 4 to 5 hours. When the free isocyanate content, as determined by titration with 2 N di-n-butyl amine, fell to 0%, the product was cooled. 21.4 parts of xylene were added to the product in order to obtain a solution containing 55% of dissolved solids. The product was then filtered and stored and needed no special protection.

*Example V*

The purpose of this example is to illustrate the preparation and application of a coating composition utilizing the pre-polymer of Example II.

23.2 parts of a cross linking agent prepared from trimethyl propane to which propylene oxide had been added to form a triol having a calculated molecular weight of 1,000 was added to 52.6 parts of the prepolymer of Example II. To the prepolymer and triol was then added 24.2 parts of xylene in order to obtain a solution containing 60% solid material dissolved therein.

Steel panels were coated with this varnish using a Bird applicator to produce a coating having a wet thickness of 3 mils. The panels were baked for 30 minutes at 150° C. thereby producing a coating having a dried thickness of about 1.8 mils. The coated steel panel exhibited excellent physical and chemical durability. Although a temperature of 150° C. was used, the coating on the steel panel could have been cured at room temperature since this prepolymer was not blocked. However, a temperature of 150° C. was used in order to obtain a faster cure.

*Example VI*

The purpose of this example is to illustrate the use of a phenol blocked prepolymer in coating a substrate.

20.5 parts of the triol used in Example V was added to 72.2 parts of the phenol blocked prepolymer of Example III. 7.3 parts of xylene was then added to this mixture in order to form a solution containing 60% of solid material dissolved therein. A steel panel was coated as in Example V. This coating had the following properties:

Hardness—2H pencil
Flexibility—⅛" mandrel
Impact resistance—160 inch-pounds impact reverse and direct without separation of the coating from the steel panel.

The coating was unaffected by a 30 day exposure to the following materials: 10% hydrochloric acid, 5% sodium hydroxide, and benzene.

*Example VII*

3.7 parts of the triol of Example V was added to 18.5 parts of the prepolymer of Example II. 16.0 parts of a commercial mixture of toluene diisocyanate isomers composed of 80% 2,4 toluene diisocyanate and 20% 2,6 toluene diisocyanate were then added to the reactor in order to provide additional isocyanate groups for reaction with the triol. 20 parts of xylene were added to the reactor in order to dilute the solution. After the additions, the temperature was raised to 80° C. and maintained there for from about 4 to 5 hours until the free isocyanate content, determined as in Example II, was 7%. The product was then filtered and diluted with 20 parts of Cellosolve acetate thus obtaining a solution containing 60% solid material dissolved therein. The product was stored under nitrogen in order to protect the free isocyanate groups. A steel panel was coated with the composition of this example using a Bird applicator. The coating had the following properties: flexibility—⅛ inch mandrel, and hardness—4H pencil hardness. The coating resisted 30 days' exposure to the following materials: 10% hydrochloric acid, 5% sodium hydroxide, and mineral spirits.

*Example VIII*

The purpose of this example is to illustrate the use of a coating composition which is an emulsion.

10.8 parts of the triol of Example V was added to 45.6 parts of the phenol blocked prepolymer of Example III. These were then blended by simple mixing and 0.85 part of morpholine castor oil soap, an emulsifying agent, and 2 parts of a 10% solution of polyvinyl butyral in Cellosolve acetate were then added to the blended mixture. 0.20 part of Duraplex D-65A, a commercial alkyd obtained from Rohm & Haas Company was then added to keep the film fluid so that air would not be trapped therein. This blend was then added to a water dispersion prepared by adding to 38.8 parts of water, with agitation, 0.25 part of sodium lauryl sulfate; 0.25 part of polyvinyl alcohol, a protective colloid; and 0.25 part of hydroxy ethyl cellulose, a leveling and bodying agent. The mixture was then passed through a hand homogenizer in order to form a stable emulsion. A steel panel was then coated with a film of this emulsion using a Bird applicator as in Example V. After allowing for a 15 minute flash off period to permit the film to clear, the panel was baked at 150° C. for 30 minutes. A clear film with good luster, an impact of 160 inch-pounds, 2H pencil hardness and excellent flexibility and adhesion was obtained. The coating exhibited excellent resistance to acids, bases and mineral spirits.

*Example IX*

The purpose of this example is to illustrate the use of another diisocyanate with a glycol conforming in formula to the glycol of Example I and prepared in substantially the same manner as in Example I.

44.5 parts of a 70% solution of the glycol in xylene was added to 55.5 parts of a 52% solution of diphenylmethane 4,4'-diisocyanate in benzene. During the addition the temperature was kept at 30° C. After the addition, the temperature was raised to, and maintained at, 50° C. until the desired isocyanate content of 8.1% was obtained as determined in the manner of Example II. The reaction was completed in 2 to 3 hours using a blanket of dry nitrogen as in Example II. A portion of the product was blocked with phenol in the manner of Example III, and the blocked and unblocked products were blended with triols for use in coating substrates.

*Example X*

The purpose of this example is to illustrate the use of a glycol containing 9 carbon atoms in the para position of both aromatic rings of the bisphenol.

The glycol used was prepared in the manner of Example I except that nonyl phenol was used in order to obtain a glycol having 9 carbon atoms in the para position of the aromatic rings of the bisphenol. 27.1 parts of a commercial mixture of toluene diisocyanate isomers composed of about 80% 2,4 toluene diisocyanate and 20% 2,6 toluene diisocyanate was added to a reaction vessel under a nitrogen atmosphere. 61.4 parts of a 70% solids solution in xylene of the glycol containing 9 carbon atoms in the para position was added to the reaction vessel. The temperature during the addition was maintained at 30° C. 11.5 parts of xylene were added to the vessel in order to obtain a solution of 70% solids dissolved in xylene, and the reaction temperature was raised to 50° C. After four hours, the desired isocyanate content of 9.3%, determined as in Example II, was reached.

Coatings prepared from this product had excellent resistance to acids and bases and excellent physical properties.

*Example XI*

The purpose of this example is to illustrate the use of a glycol prepared from a dialkyl phenol. The preparation of this glycol was conducted in the manner of Example I except that ethylene oxide was condensed with para-octyl o-cresol bisphenol.

The most reactive position on a cresol molecule is the para position. The next reactive position is the ortho position. When cresol is alkylated with an octyl group, the alkylation should take place on the para position thereby producing para-octyl cresol. When this para-octyl cresol is condensed with formaldehyde, the condensation should take place on the ortho position of the para-octyl cresol thereby producing para-octyl-ortho-cresol bisphenol. However, the above theory is offered for purposes of explanation only, and should not be construed as limiting the nature or scope of this invention.

The preparation of para-octyl-ortho cresol was conducted in substantially the manner as in Example I, except for the different reactants as aforementioned.

61.4 parts of a 70% solids solution in xylene of the glycol of this example was added to 27.1 parts of the 80/20 isomers of toluene diisocyanate. During the addition, the temperature was maintained at 30° C. 11.5 parts of xylene were then added and the temperature was raised and maintained at 50° C. for several hours until the non-volatile isocyanate content was 9.3%, determined in the manner of Example II. A dry nitrogen atmosphere was used in the preparation. The product was stored under an atmosphere of dry nitrogen. Coatings prepared from this product had excellent chemical and physical properties.

As we have demonstrated, the prepolymers of this invention may be easily prepared and are soluble in non-polar, non-oxygenated solvents such as for example toluene; benzene; xylene; hexane; naphthas such as for example Stoddards solvent, Varnish Makers' and Painters' naphtha, and many other non-polar non-oxygenated solvents. The coating compositions of this invention are extremely useful and economical as they too are soluble in non-oxygenated non-polar solvents. Moreover, coatings prepared using the coating compositions of this invention exhibit excellent physical and chemical properties.

While this invention has been described in terms of certain preferred embodiments and illustrated by means of specific examples, these are illustrative only, and the invention is not to be construed as limited, except as set forth in the following claims.

What we claim and desire to secure by Letters Patent is:
1. A composition of matter of the following structure:

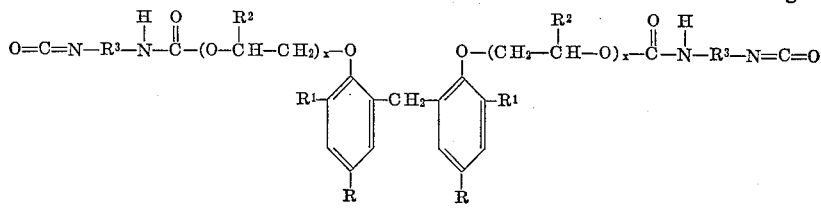

wherein R is an alkyl group of from eight to twelve carbon atoms, $R^1$ and $R^2$ are selected from the group consisting of methyl and hydrogen, $x$ is from 1 to 2, and $R^3$ is selected from the class consisting of alkylene, arylene, and arylalkylene groups, and when $R^3$ is alkylene, said alkylene $R^3$ has from about four to six carbon atoms, when $R^3$ is arylene, said arylene $R^3$ has from about six to thirteen carbon atoms, and when $R^3$ is arylalkylene, said arylalkylene $R^3$ has from about 7 to 10 carbon atoms.

2. A composition according to claim 1, wherein R is an octyl group.
3. A composition according to claim 1, wherein R is a nonyl group.
4. A composition according to claim 1, wherein $R^3$ is a tolylene group.
5. A composition according to claim 1, wherein R is an octyl group and $R^3$ is a tolylene group.
6. A composition according to claim 1, wherein R is a nonyl group and $R^3$ is a tolylene group.
7. A coating composition comprising a crosslinking agent having at least two active hydrogens, the composition of claim 1, and a solvent.
8. A coating composition according to claim 7, wherein said solvent is a non-polar, non-oxygenated liquid organic solvent.
9. A coating composition comprising a crosslinking agent, having at least two active hydrogens, the composition of claim 2, and a solvent.
10. A coating composition according to claim 9, wherein said solvent is a non-polar, non-oxygenated liquid organic solvent.
11. A coating composition comprising a crosslinking agent having at least two active hydrogens, the composition of claim 3, and a solvent.
12. A coating composition according to claim 11, wherein said solvent is a non-polar, non-oxygenated liquid organic solvent.
13. A coating composition comprising a crosslinking agent, having at least two active hydrogens, the composition of claim 4, and a solvent.
14. A coating composition according to claim 13, wherein said solvent is a non-polar, non-oxygenated liquid organic solvent.
15. A coating composition comprising a crosslinking agent, having at least two active hydrogens, the composition of claim 5, and a solvent.
16. A coating composition according to claim 15, wherein said solvent is a non-polar, non-oxygenated liquid organic solvent.
17. A coating composition comprising a crosslinking agent having at least two active hydrogens, the composition of claim 6, and a solvent.
18. A coating composition according to claim 17, wherein said solvent is a non-polar, non-oxygenated liquid organic solvent.

References Cited by the Examiner

UNITED STATES PATENTS

| | | | |
|---|---|---|---|
| 2,594,979 | 4/1952 | Nelson | 260—47 |
| 2,929,800 | 3/1960 | Hill | 260—77.5 |
| 3,078,357 | 2/1963 | Rinke et al. | 260—77.5 |
| 3,140,221 | 7/1964 | Liebling et al. | 260—868 |

OTHER REFERENCES

Wells et al., "Properties and Application of Urethane Coatings," Official Digest, 1959 (Sept.).

LEON J. BERCOVITZ, *Primary Examiner.*

HAROLD N. BURSTEIN, *Examiner.*

M. C. JACOBS, *Assistant Examiner.*